Patented June 29, 1926.

1,590,372

UNITED STATES PATENT OFFICE.

CHARLES HENRY HASLER HAROLD, OF ALDERSHOT, ENGLAND, ASSIGNOR TO UNITED WATER SOFTENERS, LIMITED, OF LONDON, ENGLAND, A BRITISH COMPANY.

PREPARATION OF STERILIZING AGENTS, GERMICIDES, AND THE LIKE.

No Drawing. Application filed January 2, 1926, Serial No. 79,031, and in Great Britain March 23, 1925.

This invention relates to the preparation of germicides, sterilants and the like and to processes of applying such agents, more particularly to the sterilization of water, sewage and so forth, although the invention is not confined to such uses.

It is the main object of the present invention to enable bodies called hereinafter "chloramines" for the purpose of definition, to be produced in solution in a state of relatively high concentration, and thereby to facilitate the use of the product for dosing into water and the like to be sterilized. The terms "chloramine" and "dichloramine" will be used throughout this specification as terms of indentification only. The body so described is characterized by having a pungent smell, sharper and more acid than that of chlorine and a taste in solution akin to that of chlorine. It possesses a germicidal power much greater than that of its equivalent of free chlorine and is soluble in, and extracted from aqueous solutions by carbon tetrachloride; also, it requires for its effective titration, the addition of acid as for the Bunsen method.

It has now been found that chloramine can be produced in relatively high concentrations by the interaction of solutions of chlorine and of ammonium salts in water. According to the present invention, the sterilizing agent is produced by setting up a reaction between aqueous solutions of chlorine and an ammonium salt, the two reagents being present in such amounts as to fall within the following range of ratios. If the mixture is allowed to stand for a period of a quarter of an hour to three-quarters of an hour at the ordinary room temperature, the mixture which was originally yellow becomes colourless and the reaction is complete. The reaction according to the invention may be carried out with the chlorine and ammonium salt in the following ratios, that is to say to each molecule of chlorine in the solution .1 molecule to 8 molecules of a mono-ammonium salt may be present. This may be stated by saying that to every gramme of chlorine in solution there may be from .025 grammes up to 2 grammes of the ammonium radicle ($NH_4$). The actual optimum range of the ratio between the constituent materials is expressed by 0.28 up to 4 molecules of mono-ammonium salt to every molecule of chlorine present. This is equivalent to 1 gramme of chlorine caused to react with any ammonium salt containing from .07 up to 1 gramme of ammonium radicle ($NH_4$). The aqueous solutions employed may be of any strength up to a saturated solution at the temperature of the addition as long as the solutions be added in such proportions that the ratio between the constituents lies within the limitation mentioned above. However, better results are obtained by using both the constituents in strong solution, as already mentioned, since it is found that the rate of reaction between the ammonium salt and the chlorine is so much diminished by decreasing the concentration of the reacting bodies that it may not proceed to completion within a practical limit of time if the concentration be reduced very far. In other words, under ordinary practical conditions, other things being equal, it is possible to obtain better results by forming the chloramines in concentrated solution and subsequently diluting them than by adding the original constituents to the entire mass of water which has to be treated.

If the ammonia is employed in the form of a salt in which the ammonia is relatively free, as for example in ammonium carbonate and its usual impurities, viz, ammonium bicarbonate and ammonium carbamate, the chlorine reacts with it at high speed, but the chloramine formed is decomposed as rapidly as it is produced unless conditions are arranged so that it is formed in low concentration. On the other hand, when the ammonia is used in the form of a salt in which it is in combination with a relatively strong acid radicle and is consequently in a comparatively tightly bound condition, the reaction proceeds more slowly, but the chloramine produced remains stable even at high concentration. In fact there is an apparent series of reactions in the formation of chloramines consisting in the use of ammonium salts beginning with the ammonium carbonate and proceeding through a number of salts and finishing with the salts containing the radicles of strong inorganic acids, such as ammonium chloride, ammonium nitrate and ammonium sulphate. It is advisable for technical reasons to avoid abnormally long contact between the reagents and consequently it is preferred to select one of the more rapidly acting salts of ammonia wherein ammonia is combined with one of the weaker acid radicles and in fact the optimum conditions seem to be attained when using diammonium hydrogen phosphate, although by using that salt the rapidity of the reaction is not as great as with ammonium carbonate and the high stable concentration obtainable with ammonium sulphate is equally not reached.

In order that the invention may be clearly understood and readily carried into effect, some examples of processes for the formation of the new sterilizing agent will now be described in somewhat greater detail. A concentrated solution of chlorine in water is mixed with a strong solution of di-ammonium hydrogen phosphate in water. The ratios between the reagents already expressed are followed and that is to say in this case the reagents are mixed in a ratio lying between .0917 grammes and 7.33 grammes of di-ammonium hydrogen phosphate to each gramme of chlorine in the solution. Best results are obtained by working within the optimum conditions already referred to, that is to say by employing between .256 and 3.67 grammes of di-ammonium hydrogen phosphate to each gramme of chlorine in the solution and within these ratios the production of di-chloramines is such as to give a figure for available chlorine equal to 50 per cent of the chlorine added as might be expressed by the equation:—

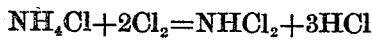

$$NH_4Cl + 2Cl_2 = NHCl_2 + 3HCl$$

The temperature at which the reacting materials are maintained is of considerable importance. In the case of any particular suitable mixture, if a low temperature is maintained, the time occupied before the reaction is complete will be much increased. High temperatures must be avoided although it is sometimes advisable in order to produce a rapid reaction, to carry out the process at temperatures of 38 to 40 degrees C., but a satisfactory reaction may always be carried out in a reasonable time at normal atmospheric temperature.

According to an example of carrying out the invention with a weak ammonium salt, for instance ammonium carbonate, 0.268 grammes of chlorine are added as a 0.5 per cent solution to 6600 c. c. of water containing from 0.106 to 1.7 grammes of commercial ammonium carbonate. A solution of chloramines is obtained having a proportion of mono and di-chloramines depending upon the relative amounts of ammonium carbonate actually used. The resulting solution is stable and unaccompanied by any considerable decomposition. If, however, the ammonium carbonate were used, for example as a 15 per cent solution and the chlorine in the condition of high concentration, decomposition would be rapid with the evolution of elementary nitrogen.

As a contrast with the behaviour with the above concentrations of materials, an example of the use of an ammonium salt containing a strong acid radicle will now be considered. A quantity of a 15 per cent solution of ammonium chloride varying from 25 c. c. up to 2000 c. c. is added to a strong aqueous solution of chlorine containing 50 grammes of chlorine in solution. These quantities are equivalent in proportions by weight to from 3.75 grammes of ammonium chloride up to 300 grammes of ammonium chloride to 50 grammes of chlorine. The best results are obtained when the amount of ammonium chloride added to 50 grammes of chlorine lies between the limits of 10.5 to 150 grammes. At the higher values of the ratios of amounts of ammonium salt to chlorine, there is a loss of available chlorine due to a further reaction with liberation of elementary nitrogen. For example, if 3 grammes of ammonium chloride as a 15 per cent solution be added to a saturated solution of chlorine, the loss due to this secondary reaction is already considerable.

As a further example, if 9.5 grammes of a 40 per cent by weight solution of ammonium sulphate be added to 1180 c. c. of an aqueous solution of chlorine containing .6 per cent by weight of chlorine and the mixture is allowed to stand for a time depending upon the prevailing temperature, the solution becomes colourless and will then contain di-chloramine at a concentration of between 3000 and 4000 parts per million, that is to say, it shows an available chlorine content of about 0.3 per cent.

Again, the addition of 160 grammes of a 25 per cent by weight solution of ammonium nitrate to 14 litres of chlorine water containing .5 per cent by weight of chlorine produces a similarly strong solution of di-chloramine.

In the above, examples of processes in accordance with the invention are given as examples wherein salts containing ammonia in a comparatively free condition, such as ammonium carbonate are employed and salts wherein the ammonia is in a relatively bound condition, such as ammonium chloride, ammonium nitrate and ammonium sulphate, are employed as well as an example of a salt of an intermediate nature, namely di-ammonium hydrogen phosphate, which, for the reasons stated, is preferred, but it is to be understood that other ammonium salts may be used and in fact the salts of ammonium which could conveniently be used in practice can be placed in an ascending order as regards stable concentration as follows:—
At the one end we have ammonium carbonate with its common impurities, ammonium bi-carbonate and ammonium carbamate and then there is an interval and then the ammonium salts roughly in order of the strengths of their acid radicles such as is given by the following series:— ammonium oleate, ammonium acetate, ammonium borate, di-ammonium hydrogen phosphate, ammonium formate, ammonium tartrate, ammonium citrate, ammonium lactate, ammonium chloride, ammonium nitrate and ammonium sulphate. The reactions can be carried out with any of these salts if the ratio between the amount of the salt and the amount of chlorine brought into admixture lies within the limits already expressed.

The solutions of chloramine prepared according to the present process, are preferably employed for sterilization purposes within a short time after their preparation, but if protected from heat and bright sunlight, they may be stored for several hours without appreciable decomposition. The solution exerts a sterilizing action greatly in excess of that of a solution of elementary chlorine or hypochlorite of equivalent strength and its sterilizing action is not inhibited by the presence of organic matter which absorbs chlorine. The solution may, therefore, be employed in the sterilization of sewage-contaminated waters without previous clarification. This, of course, cannot be carried out by the use of chlorine alone unless excessive amounts of chlorine are employer.

The chloramine solution prepared in accordance with the present invention may be added to water to be treated by the usual methods of dosage such as are employed for the addition of other reagents in solution to water. Furthermore, the solution of chloramine may be employed not only for the sterilization of water but for the purposes of an antiseptic and germicide in general practice.

Although the terms "chloramine" and "dichloramine" have been used throughout for the reason already mentioned, it must not be assumed that such a body is the sole product resulting from processes according to the present invention. Probably, the reaction proceeds in several stages with the formation of intermediate products which exist in solution for periods depending upon the conditions of temperature and the ratio of the relative amounts of the materials present. As already stated, the processes disclosed above yield solutions of high germicidal value, although the germicidal value of the particular solution obtained, will vary with variation in the degree of concentration or in other conditions employed.

Having thus described my invention, what I claim as new and desire to secure by Letters Patent is:—

1. A process for the production of a sterilizing agent which consists in adding a solution of chlorine to a solution of an ammonium salt, the solutions being of such relative strengths that said solution of ammonium salt contains an amount of the ammonium radicle ($NH_4$) of between .025 grammes and 2 grammes to each gramme of chlorine in said chlorine solution.

2. A process for the production of a sterilizing agent which consists in adding a solution of chlorine to a solution of an ammonium salt, the solutions being of such relative strengths that said solution of ammonium salt contains an amount of the ammonium radicle ($NH_4$) of between .07 grammes and 1 gramme to each gramme of chlorine in said chlorine solution.

3. A process for the production of a sterilizing agent which consists in mixing together solutions of chlorine and an ammonium salt in such relative strengths that the ammonium salt solution contains from .07 grammes to 1 gramme of ammonium radicle ($NH_4$) to each gramme of chlorine in the chlorine solution and maintaining said solutions at ordinary atmospheric temperature until the reaction is complete.

4. A process for the production of a sterilizing agent which consists in mixing together solutions of diammonium hydrogen phosphate and chlorine in such relative strengths that the phosphate solution contains from .256 grammes to 3.67 grammes of phosphate to each gramme of chlorine in the chlorine solution.

5. A process for the production of a sterilizing agent which consists in mixing together strong aqueous solutions of diammonium hydrogen phosphate and chlorine in such relative strengths that the phosphate solution contains from .256 grammes to 3.67 grammes of phosphate to each gramme of chlorine in the chlorine solution.

In witness whereof I hereunto subscribe my name this 22nd day of December 1925.

CHARLES HENRY HASLER HAROLD.